United States Patent [19]

Grilletto et al.

[11] 4,260,886

[45] Apr. 7, 1981

[54] MEASUREMENT OF A GAS CONSTITUENT BY A MASS SPECTROMETER

[75] Inventors: Carlo Grilletto, Upper Black Eddy, Pa.; Frank C. Vowinkel, White House Station, N.J.

[73] Assignee: RCA Corporation, New York, N.Y.

[21] Appl. No.: 73,199

[22] Filed: Sep. 7, 1979

[51] Int. Cl.³ .............................................. B01D 59/44

[52] U.S. Cl. .................................... 250/288; 73/1 G; 250/252; 250/289

[58] Field of Search ............... 250/281, 252, 288, 289; 73/1 G

[56] References Cited

U.S. PATENT DOCUMENTS

| | | | |
|---|---|---|---|
| 2,714,164 | 7/1955 | Riggle et al. | 250/289 |
| 3,665,748 | 5/1972 | Mator | 73/1 G |
| 4,151,738 | 5/1979 | Hyer | 73/1 G |

*Primary Examiner*—Harold A. Dixon
*Attorney, Agent, or Firm*—Samuel Cohen; William Squire

[57] ABSTRACT

The accuracy of measurement of a constituent of a small volume of gas (such as the moisture within an integrated circuit package) is improved by improving the accuracy of the calibration of the spectrometer being used to make the measurement. The calibration is achieved by measuring with the spectrometer the known amount of the constituent in a reference sample of about the same size as the small volume of gas in the test sample.

6 Claims, 3 Drawing Figures

MEASUREMENT OF A GAS CONSTITUENT BY A MASS SPECTROMETER

The present invention relates to mass spectrometers for analyzing gases.

Hermetically sealed integrated circuit packages filled with an inert gas such as nitrogen are in widespread use. Moisture, which sometimes enters the package during the manufacturing process, for example, due to leaks in the hermetic seal, has an undesirable effect on the performance of the circuits within the package.

It is therefore desirable during the manufacturing process periodically to test the packages for moisture content. As the moisture content is extremely low, for example, about 500 parts per million (PPM), a very sensitive mass spectrometer instrument may be used to make the test. The sensitivity of such an instrument is so high that small changes in any one of many variables in the testing conditions can introduce errors. For example, moisture attacks various metals including stainless steel and nickel, which may be used in the construction of the mass spectrometer instrument and this affects the measurement and calibration accuracy. Also, the volume of the gas is very small so that small absolute errors translate to large percentage errors.

To test an integrated circuit hermetically sealed package with a mass spectrometer, the package is placed within an evacuated sample chamber in the spectrometer and a piercing needle is then caused to penetrate the packages exterior wall and enter its nitrogen filled interior. The nitrogen passes through the pierced openng and enters the chamber where it is eventually analyzed. This gives one reading.

To provide meaningful results to this one reading, the spectrometer needs to be calibrated with a standard gas having a standard moisture content. The calibration should be of sufficient reliability and repeatability to provide scientifically reliable results. A problem with past calibration systems is that they have not always proved to be as reliable as desired. This is sometimes due to capture of some of the moisture by parts of the system before a calibration measurement can be made. Also because the gas volumes are low, differences in flow rates between the gas sample and the calibration sample can introduce appreciable errors.

In a system for determining the concentration of a constituent of a gas by a mass spectrometer, from a relatively small sample of the gas, a test sample is introduced during one time interval into the manifold of the spectrometer and then analyzed by the spectrometer, and the results of this analysis are compared with the results of the analysis of a reference sample of the gas introduced during a second time interval into the manifold of the spectrometer. In an improved system embodying the invention, means are provided for obtaining and storing a reference sample of roughly the same volume as the test sample. This reference sample is employed as the standard with which the test sample is compared during the second time interval.

Figure 1:
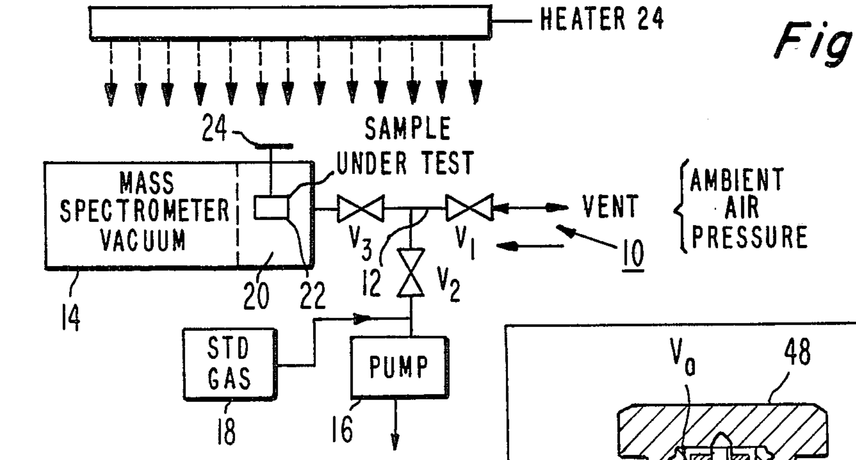
FIG. 1 is a schematic diagram of an embodiment of the present invention.

In FIG. 1, valve 10 in accordance with an embodiment of the present invention comprises three valves $V_1$, $V_2$, and $V_3$ and chamber 12 which is in fluid communication with all of the valves $V_1$, $V_2$, and $V_3$. Valve $V_1$ is in fluid communication with the ambient atmosphere. Valve $V_3$ is connected to the input manifold of mass spectrometer 14 via the gas sampling chamber within the spectrometer input manifold 20. Valve $V_2$ is connected to a source of standard gas 18 and to a pump 16. The standard gas may be in a pressurized container in which case the pump 16 is not necessary. The pump 16 is used to pump air through the valves $V_1$ and $V_2$.

The mass spectrometer 14 is a conventional apparatus which includes an inlet manifold 20 in which a sample 22 under test is placed. Connected to the spectrometer is a piercing device 24 which has a needle which pierces the casing of the sample 22 under test to release the hermetically sealed atmosphere within the sample into the intake manifold 20 of the spectrometer. The device 24 includes a needle mounted on a threaded shaft which, when rotated, forces the needle against the package of the sample under test 22 and penetrates it, and thus results in the gas from within the package being drawn into the intake manifold by the vacuum of the spectrometer. This newly released gas then enters into the spectrometer for analysis. The inlet manifold 20 and the valve device 10 are heated by heater 24 to an elevated temperature of about 115° C. to vaporize all moisture particles in the system.

In the operation of the system of FIG. 1, the device 10 is first purged with the standard gas 18 or in this case, air. The heater 24 is on at this time. Assuming for the moment that the standard gas is ambient air at room temperature, the pump 16 pumps the air from the ambient into the chamber 12 and through open valve $V_1$ and exhausts the air through open valve $V_2$ into the ambient. If a cylinder of pressurized gas is used as a standard gas 18, then this gas is fed into valve $V_2$ and exhausts through valve $V_1$. Valve $V_3$ is closed. Storage chamber 12 has a volume which is approximately the volume of the chamber within the device 22 holding the gas to be tested. For example, this may be 1 millileter (ML). The standard gas may be passed through the system of device 10 for approximately one half hour to purge the system. The valves $V_1$ and $V_2$ are then closed with the exhaust valve closed first. After 15 minutes have elapsed, valve $V_3$ is opened and the trapped heated standard volume of air in the chamber 12 enters the mass spectrometer for analysis.

The moisture content analyzed by the mass spectrometer represents the moisture of ambient atmosphere. A fan is used to circulate room air about the device 10 to insure homogenity. The dew point reading of immediate air is taken prior to closing valve $V_2$ with an Alnor Dew Pointer. The calibration factor is computed by $$\frac{H_2O \text{ Peak Ht.}}{N_2 \text{ Peak Ht.}} \div \text{Dew Point } H_2O \text{ content} \div .79\ (N_2 \text{ content of air}) \quad (1)$$

where peak height is the peak height on a curve plotted by the mass spectrometer. The moisture content of the sample under test is determined by dividing the calibration factor into the sample $H_2O/N_2$ peak height intensity ratio.

The sample is placed in the inlet manifold 20 of the spectrometer. The sample is preheated in a vacuum of about 115° for 16 hours prior to analysis. When the sample is put in the manifold 20, the manifold is back flushed with dry $N_2$ open to the atmosphere to prevent contamination of the sample chamber. The intake manifold 20 is heated to 115° C. and the atmosphere in the intake manifold diffusion pumped to a vacuum for 15 minutes, minimum. The remainder of the mass spectrometer inlet system is continually maintained at 125° C. The heater, while illustrated as a single block, is intended to represent multiple heaters capable of independent control for obtaining the desired temperatures in different parts of the system. The spectrometer is set to moisture peak on the recorder at an Atomic Moisture Unit (AMU) 18 (Atomic Mass of Water). The standard gas, e.g. 100 ppm moisture gives a particular peak response for this instrument setting. If 1000 ppm is used the response should be 10 times greater. The package under test 22 is pierced by the piercing device 24 (with the valve $v_3$ closed) and this permits the expanded gas within the package 22 to pass into the manifold 20.

The mass molecular weight range of interest is scanned from a range of about 2 to 70 molecular weights and the $N_2$ and other constituent element peaks of interest are measured. The $N_2$ peak height remains sufficiently constant for at least 10 minutes after the piercing, thereby making its measurement not time critical.

An important aspect of the present invention is that the ambient air from the storage chamber 12 (the calibration sample) is released into the spectrometer under approximately the same conditions as the volume of gas (the test sample) from the unit under test 22. It has approximately the same volume and is released almost instantaneously when the valve $V_3$ is opened similar to the gas in the package of the unit under test 22 when pierced. These similar conditions under which the calibration and test samples enter the spectrometer have been found to be extremely critical for insuring repeatability, reliability and accuracy. The concentration of moisture in the package under test 22 is determined by direct comparison of the $H_2O$ over $N_2$ ratio of the sample to the standard, using the calibration factor of Equation 1 above.

Fixed gas standard, such as bottled gas and room air, are relatively reliable since they can deliver a consistent $H_2O$ concentration at a substantial flow rate. Repeated comparisons between instrument calibration factors when calculated with the bottled and room air on the same day show good reproducability. Additionally, in approximately 70 routine calibrations over an 8 month period, the factor varied by a maximum amount of about ±15%.

Figure 2:
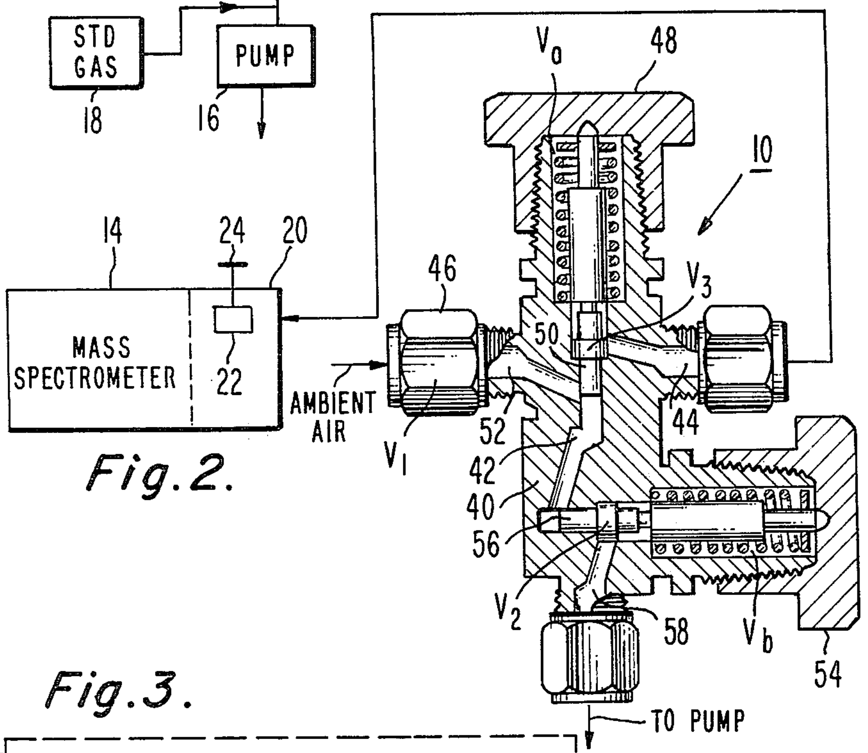
FIG. 2 is a block and sectional side elevation view of a valve device represented by a portion of the schematic of FIG. 1.

In FIG. 2 the valve device 10 is shown in more detail. The device 10 includes the housing 40 which has a sample storage chamber 42 which corresponds to chamber 12 of FIG. 1. The chamber 42 is coupled to the ambient air through a conduit 52 which may be sealed from the ambient air by an end cap 46 (corresponding to valve $V_1$of FIG. 1) which is threaded to housing 40. Rotatable valve assembly 48 is mounted to the housing 40. Assembly 48 has a valve 50 (corresponding to $V_3$ of FIG. 1) which opens and closes the chamber 42 to conduit 44. Conduit 44 connects to the mass spectrometer 14 inlet manifold 20. A second valve assembly 54 has a valve 56 (corresponding to $V_2$ of FIG. 1) which opens and closes chamber 42 to the pump 16 via conduit 58. Valve assemblies 48 and 54 may be identical. These are conventional valve assemblies and need not be described in detail. Chamber 42 and conduit 52 are always in continuous fluid communication. Chamber 42 and the interior volume $V_a$ and $V_b$ of the valve assemblies 48 and 54, respectively, are in fluid communication when the valves are open and isolated when the valves are closed. The combined volumes of chamber 42 and 52 which form the calibration gas storage chamber are approximately one millileter in the present embodiment and match approximately the test volume. This volume may be less or more in accordance with a given implementation. The rotation of the valve assembly 48 opens and closes conduit 44 to the chamber 42 and the rotation of the valve assembly 54 opens and closes conduit 58 to the chamber 42. Opening the end cap 46 couples the conduit 52 to ambient atmosphere. Of course, other atmospheres or standard gases may be connected to the conduit 52. Conduit 52 and chamber 42 are about the same in volume.

When the system is being purged with a standard calibration gas, valves $V_1$ and $V_2$ are open and valve $V_3$ is closed. Volume $V_a$ is sealed from the calibration gas while volume $V_b$, conduit 52 and chamber 42 are purged. After purging, valves $V_1$ and $V_2$ are closed and valve $V_3$ is opened. The vacuum of the spectrometer creates a vacuum in volume $V_a$ and the standard gas is drawn from chamber 42 and conduit 52 into the spectrometer. After calibration, the valve $V_3$ is closed, in effect sealing the vacuum atmosphere in volume $V_a$. Thus, this volume is at a vacuum during use and does not have to be purged.

Figure 3:
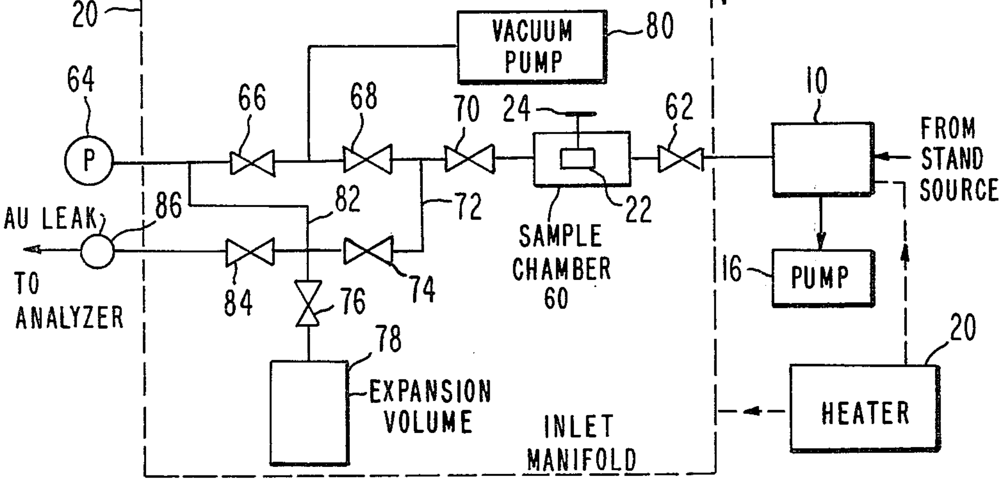
FIG. 3 is a schematic diagram showing additional details of the mass spectrometer system of FIG. 1.

In FIG. 3, intake manifold 20 of the mass spectrometer 14 is shown in more detail. Sample 22 which may be an integrated circuit assembly is retained in a sample chamber 60 in the inlet manifold 20. The penetrating needle 24 is attached to the sample chamber in a conventional manner. Chamber 60 is connected to the valve device 10 by an inlet valve 62. Chamber 60 is connected to a pressure gauge 64 through valves 66, 68 and 70. Conduit 72 couples the junction between valves 68 and 70 through valves 74 and 76 to and expansion volume 78. Valve 76 is coupled between the expansion volume 78 and pressure gauge 64 by conduit 82. Gauge 64 is coupled to vacuum pump 80 through valve 66. Conduit 82 at the junction between valve 74 and 76 is connected to the mass spectrometer analyzer section through valve 84 and AU leak 86. The AU leak is a thin metal foil with a small slot to permit slow leakage of the gas under analysis from the expansion volume 78.

As before, a sample to be tested is preheated in a vacuum oven at 115° C. for 16 hours prior to analysis. Sample 22 is put in the sample chamber 60 which is back flushed with dry nitrogen when opened to the atmosphere. The sample chamber 60 is heated to 115° C. and the vacuum pump 80 is operated for a minimum of 15 minutes with all the valves except valve 62 open, thereby evacuating the system.

The vacuum pump 80 is then closed off from the system by shutting valves 68 and 66. At this time the spectrometer is set at the moisture peak of AMU 18 in a known manner. Valve 62 is closed and valves 70 and 74 are opened and the spectrometer is now monitoring background moisture in the inlet manifold and the sample chamber 60 containing the unpierced sample 22.

The needle in the piercer 24 is advanced until it penetrates and pierces the package 22. The gauge 64 is monitored until it indicates a maximum pressure reading. This usually occurs within 2 seconds after piercing. Upon piercing of package 22 the atmosphere thereof is immediately drawn into the surrounding ambient vacuum at a relatively rapid expansion flow rate. After the two second interval valve 74 is closed and the expanded gas is now leaked into the analyzer from the one liter expansion volume 78. The expanded gas is leaked through valve 76 and 84 through the AU leak 86. The mass range of interest is scanned and the nitrogen and other peaks of interest are measured. The nitrogen peak height remains sufficiently constant for at least 10 minutes after piercing, thereby making its measurement not time critical.

The system is once again evacuated by the vacuum pump 80. Valve device 10 coupled to the inlet valve 62 of the inlet manifold is then operated as discussed above. This introduces the standard gas into the system. Thus, identical flow characteristics are imparted to the gas from the valve 10. The standard gas from the valve 10 stored in the chamber 42 is injected by bursting into the inlet system when valve $V_3$ is opened at about the same volume and about the same flow rate as when the package 22 is pierced. The path traversed by the moisture laden standard gas is similar to that traversed by the gas from the sample 22. The small path between the valve device 10 and the sample chamber 60 does not provide a significant influence over the readings. Since the volume of gas between that from the sample and that from the device 10 are about the same as is the manner of injection of the gases into the system, from a sealed environment to a vacuum, and its flow path characteristics to the analyzer via the expansion volume 78 are the same, the results are very close and repeatable.

While a standard gas may be room air, it may comprise other gaseous mixtures including a fixed water nitrogen standard gas or a mixture of dry nitrogen and nitrogen bubbled through water in different mixtures to provide different moisture content. The moisture in the latter gas is determined by an Alnor Dew Pointer in a conventional manner.

The test of the instrument response characteristics of an instrument constructed in accordance with the present invention was accomplished utilizing a combination of 22 standards of gases comprising a fixed water nitrogen standard gas, room air and a mixture of dry nitrogen and nitrogen bubbled through water at different moisture levels. A curve was derived yielding a linear expression Y=ax where Y is the concentration and x is the instrument response $$\frac{H_2O \text{ peak height}}{N_2 \text{ peak height}}.$$

The interpretation of the resulting curve shows that the mass spectrometer calibration system constructed in accordance with the present invention exhibits a linear response from 175 to 10,000 PPM $H_2O$, and thus a simple ratio calibration method as described above is valid in this range. This linearity is attributed to the fact that the atmosphere of the sample and that of the standard gas are introduced into the spectrometer system in substantially the same manner.

While the present example analyzes moisture in the sample, it should be understood that other gas constituents may be analyzed in the test atmosphere. For example, such constituents may include oxygen, $CO_2$, helium, nitrogen and other gases and other components.

What is claimed is:

1. In a mass spectrometer system including means for analyzing a gas constituent at a first pressure and means for piercing a hermetically sealed package of a given volume and for injecting the sealed atmosphere of said package into said analyzing means for determining the content of said constituent in said sealed atmosphere, said analyzing means analyzes tending to be a function of the injection rate and volume of said atmosphere, means for calibrating said spectrometer comprising:

means for injecting a calibration gas into said spectrometer having a volume and injection rate about the same as the atmosphere from the package upon said piercing.

2. The calibrating system of claim 1 wherein said means for injecting includes means for containing said calibration gas at ambient atmospheric pressure and means for fluid coupling said means for containing with the vacuum of said spectrometer, the pressure differential therebetween thereby resulting in the injection of the contained gas into said spectrometer.

3. The calibrating system of claim 1 wherein said means for injecting includes a housing having a chamber forming said calibration gas volume, first valve means connecting said chamber to said spectrometer, second valve means for connecting said chamber to the ambient, third valve means for connecting said chamber to a source of said calibration gas, said chamber being at atmospheric pressure.

4. In a mass spectrometer apparatus for analyzing moisture in a test atmosphere of a given volume and pressure, said apparatus including a test chamber for receiving said test atmosphere and having a vacuum pressure forming a pressure differential with said test atmosphere, said test atmosphere being instantaneously exposed to said test chamber for bursting the test atmosphere into said test chamber results in a flow rate which tends to influence the analysis of said test atmosphere, a calibration device for simulating said test atmosphere bursting flow rate comprising:

means for storing a calibration atmosphere having a predetermined amount of said moisture at a volume and pressure about the same in value as said given volume and pressure, and means for instantaneously coupling said means for storing in fluid communication with said test chamber.

5. The device of claim 4 wherein said means for storing includes a housing having a storage chamber having a volume about the same in value as said given volume, inlet means for introducing said calibration atmosphere into said chamber, purge means for purging said chamber of contaminants, and outlet means for selectively fluid coupling said storage chamber to said test chamber.

6. In a mass spectrometer apparatus for analyzing gases in an analyzing chamber in comparison to a standard gas analyzed in said chamber, a gas sample holding device for inserting said standard gas into said chamber comprising:

a housing including a standard gas sample storing chamber, first valve means for selectively coupling one end of said storing chamber in fluid communication with said analyzing chamber, second valve means for selectively coupling said one end in fluid communication with the ambient, and third valve means for selectively coupling said storing chamber at the other end in fluid communication with a source of said standard gas.

* * * * *